Jan. 12, 1943.　　　A. H. MAUDE　　　2,308,293
APPARATUS FOR SYNTHESIS OF AMMONIUM CHLORIDE
Filed March 13, 1941
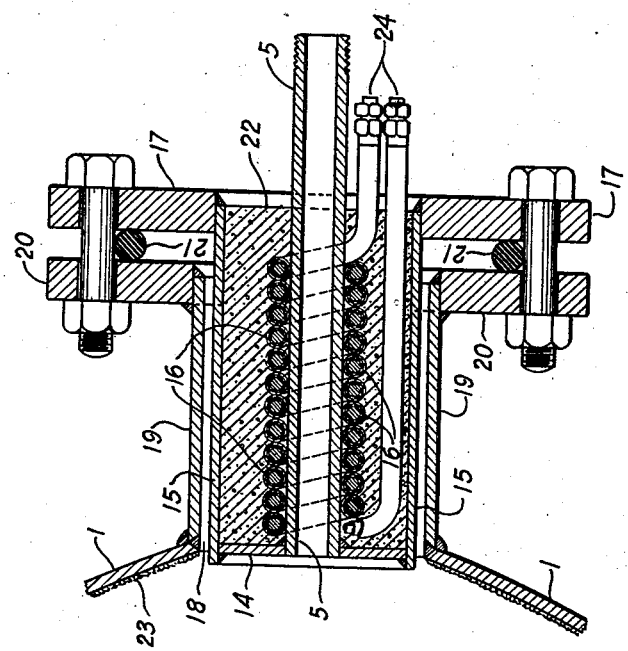
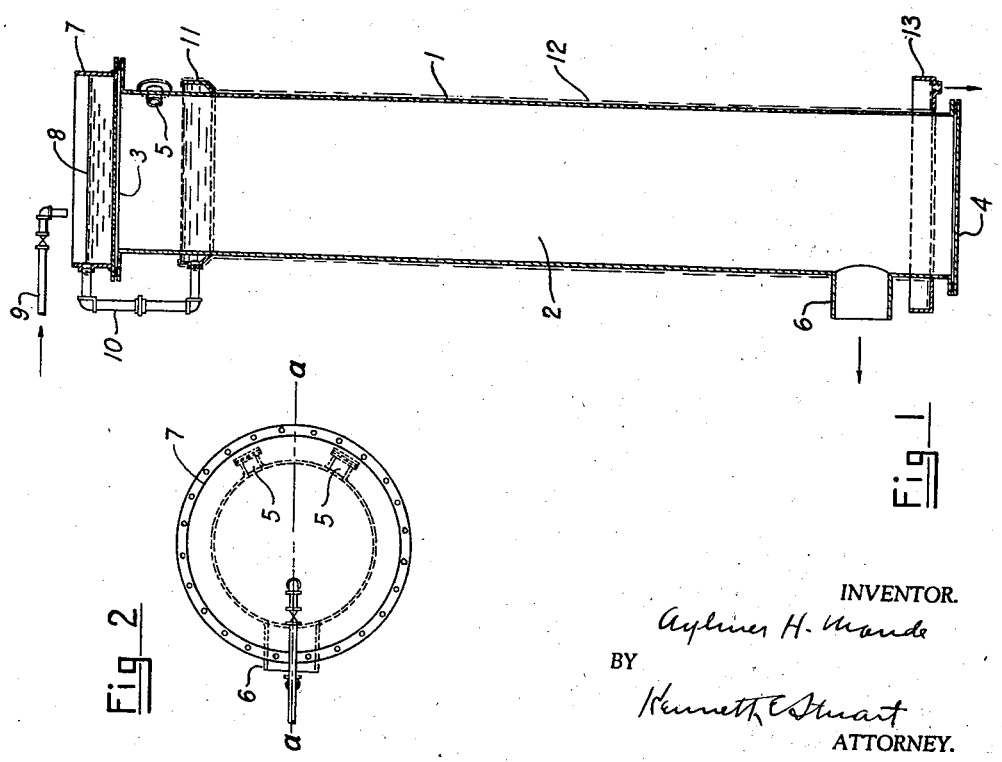
INVENTOR.
Aylmer H. Maude
BY
Kenneth E. Stuart
ATTORNEY.

Patented Jan. 12, 1943

2,308,293

UNITED STATES PATENT OFFICE 2,308,293

APPARATUS FOR SYNTHESIS OF AMMONIUM CHLORIDE

Aylmer H. Maude, Niagara Falls, N. Y.

Application March 13, 1941, Serial No. 383,183

4 Claims. (Cl. 23—285)

Ammonium chloride ordinarily exists only in solid form. It cannot be melted except under very high pressure. When heated at ordinary pressure it sublimes, i. e., it dissociates and reforms elsewhere. Consequently, when ammonia and hydrogen chloride are brought together, at atmospheric pressure, nothing happens unless the conditions are such that the product of their combination can go directly to the solid state. That means in general that ammonia and hydrogen chloride combine at the subliming temperature of the product. This is a function of the surrounding gaseous envelope. In the open atmosphere ammonium chloride sublimes at 200° C. In a closed container filled with the gases themselves, from which air is excluded, ammonium chloride sublimes at 349° C. As this is the condition ordinarily obtaining in any closed reaction chamber for synthesis of ammonium chloride, it may be assumed that for ammonium chloride to form in a reaction chamber the walls must not be hotter than 349° C. and should preferably be at a considerably lower temperature. Unless heated from an independent source, the walls of a reaction chamber in contact with the atmosphere will naturally be considerably cooler than the reaction product. This is especially true of the pipes through which the gases are admitted, as these are in contact with the walls of the reaction chamber and have of themselves a large radiating surface in proportion to cross section. The product therefore condenses upon all metallic surfaces within reach, including those of the gas inlet pipes. Although it falls of itself from time to time, unless prevented from doing so, it is liable to encroach upon the open ends of these pipes and eventually obstruct them.

Attempts have been made to combine hydrogen chloride and ammonia in a stoneware reaction chamber and condense the product upon a cooled rotating drum, but apparently the results have been unsatisfactory, as this process has never become commercial.

It would of course be possible to prevent condensation of ammonium chloride over the mouths of the gas inlet pipes by heating the walls of the surrounding chamber; but this would be uneconomical, in view of the fact that the product must be condensed and cooled before it can be packaged.

I have now found a very simple way by which to prevent obstruction of the gas inlet pipes without heating any considerable extent of the reactor wall. It consists in applying localized heat directly to the exterior of the gas inlet tubes, near the point at which they penetrate the walls of the reactor. For this purpose a temperature of at least 350° C. is required and a temperature of 400° C. is preferred. These temperatures are too elevated to be supplied by steam, but hot oil may be used. However, I prefer to wind the pipes with electric heater coils. Some of the heat supplied in this way of course finds its way from the pipes to the reactor wall, so that the mouth of each pipe is surrounded by a zone at too elevated a temperature to permit of condensation of the ammonium chloride. Hence the mouths of the pipes cannot become obstructed.

Referring to the drawing:

Fig. 1 is a sectional elevation of an apparatus for reaction of hydrogen chloride with ammonia in section along line a—a of Fig. 2.

Fig. 2 is a plan view of the same.

Fig. 3 is an enlarged detail, in section, of one of the gas inlets to the reaction chamber and a portion of the adjacent wall.

Referring to the figures:

1 is a cylindrical steel shell forming the main reaction chamber 2, flanged and closed at the upper and lower ends by covers 3 and 4 respectively.

Near the upper end of chamber 2, a short distance below cover 3, gas inlet pipes 5 are let in through shell 1. These pipes are preferably located in the same horizontal plane or cross-section of the chamber, and normal to the shell, so that they project radially from it and the streams of gas issuing from them tend to meet at the axis of the cylinder.

Shell 1 is provided with an outlet 6 for any inert gases that may be present.

Cover 3 is provided with vertically extending concentric rim 7, forming with cover 3 a pan 8, adapted to hold cooling water. Pipe 9 is adapted to supply water to pan 8. Overflow pipe 10 conducts water from pan 8 to annular pan 11, from the rim of which the water overflows. The water overflowing from pan 11 flows over the shell 1 of the reaction chamber, as indicated at 12, and is collected in annular pan 13 whence it is conducted to the sewer.

The product is recovered from time to time by removing cover 4 and thus opening the lower end of chamber 2.

In order to minimize loss of heat from the pipe 5—5 to the reactor wall 1, I preferably insulate the pipes from the surrounding wall. Various ways of doing this will suggest themselves to persons skilled in the art. One such way is illustrated in Fig. 3, in which 1 indicates the wall of the reaction chamber and 5 a gas inlet pipe (for ammonia or hydrogen chloride). At or near the end of pipe 5 I provide a flange 14. I likewise provide an outer jacket 15, concentric with pipe 5 and attached to flange 14, forming with pipe 5 and flange 14 an annular chamber adapted to house heating coils 16. Jacket 15 is likewise flanged at 17. An opening 18 is provided in wall 1 and into this opening is fitted the end of a short section of pipe or throat 19, the inner diameter of which is slightly larger than the outer diameter of jacket 15. Pipe 19 is likewise flanged at 20. Flanges 17 and 20 are adapted to be bolted together to hold jacket 15 and throat 19 in concentric relation. Packing 21 may be interposed between flanges 17 and 20, to serve both as a gasket and as a heat insulating medium. The lengths of jacket 15 and throat 19 are preferably such that when the parts are assembled the surface of flange 14 is approximately flush with the inner surface of wall 1. Heating coils 16 are embedded in a good heat transfer medium indicated at 22 and through this the heat generated is conducted not only to pipe 5, but also to flange 14 and jacket 15. The inner surface of pipe 5 and outer surfaces of flange 14 and jacket 15 are therefore readily maintained at a temperature too elevated to permit of condensation of ammonium chloride thereon. The annular space between jacket 15 and throat 19 effectually prevents loss of any considerable part of the heat to wall 1. The deposit of ammonium chloride therefore may build up upon wall 1, as indicated at 23, without any possibility of its obstructing the mouth of inlet pipe 5. The gas inlet pipes for ammonia and hydrogen chloride are constructed and connected to the reaction chamber in similar manner.

Electrical connection to coils 16 is made through terminals 24.

By means of an apparatus constructed in the manner described, I find it entirely practicable to combine anhydrous ammonia and hydrogen chloride directly, collecting the product upon the walls of the reaction chamber, from which it is removed in a manner which need not be described, as it forms no part of the invention.

I claim as my invention:

1. An apparatus for synthesis of anhydrous ammonium chloride from the anhydrous reagents ammonia and hydrogen chloride, comprising a wall structure defining a reaction chamber; openings therethrough for introduction of said reagents, said openings being provided with outwardly directed tubular extensions fitted and fixed thereto; joint elements fitting into said tubular extensions and carrying conduits terminating in said chamber, each independently of the other, said conduits being surrounded near their ends by heating elements within said joint elements; said conduits and heating elements being fixed by said joint elements in position in said tubular extensions out of direct contact with the walls of said extensions and reaction chamber; means for supplying heat to said heating elements and means for cooling said wall structure, excepting zones thereof enclosing each of said openings.

2. An apparatus for synthesis of anhydrous ammonium chloride from the anhydrous reagents ammonia and hydrogen chloride, comprising a wall structure defining a reaction chamber; openings therethrough for introduction of said reagents, said openings being provided with outwardly directed tubular extensions fitted and fixed thereto; joint elements fitting into said tubular extensions and carrying conduits terminating in said chamber, each independently of the other, said conduits being flanged near their ends and surrounded by jackets forming with said conduits and their flanges heater compartments within said joint elements; said conduits with their jackets being fixed in position in said extensions with their jackets out of direct contact with the walls of said extensions and of the reaction chamber; means for supplying heat to said heater compartments and means for cooling said wall structure, excepting zones thereof enclosing each of said openings.

3. An apparatus for synthesis of anhydrous ammonium chloride from the anhydrous reagents ammonia and hydrogen chloride, comprising a wall structure defining a reaction chamber; openings therethrough for introduction of said reagents, said openings being provided with outwardly directed tubular extensions fitted and fixed thereto and said tubular extensions with flanges at their outer ends; conduits terminating in open mouths communicating with said chamber, each independently of the other, said conduits being flanged near their open mouths and surrounded by jackets forming with said conduits and their flanges heater compartments projecting into said tubular extensions, the exterior dimensions of said jackets being substantially less than the interior dimensions of said tubular extensions; flanges upon said jackets adapted to clamp against and form joints with the corresponding flanges of said tubular extensions, fixing said conduits in position in said tubular extensions with their jackets out of direct contact with the interior thereof; means for supplying heat to said heater compartments and means for cooling said wall structure, excepting zones thereof enclosing said openings.

4. An apparatus as claimed in claim 1 in which the open mouths of said conduits are substantially flush with the inner surface of the walls of said chamber.

AYLMER H. MAUDE.